(12) United States Patent
Bernhardt et al.

(10) Patent No.: US 11,070,100 B2
(45) Date of Patent: Jul. 20, 2021

(54) STATOR FOR AN ELECTRIC MACHINE, ELECTRIC MACHINE AND PRODUCTION METHOD

(71) Applicant: Siemens Aktiengesellschaft, Munich (DE)

(72) Inventors: Michael Bernhardt, Bad Neustadt (DE); Daniel Fritsch, Oberleichtersbach (DE); Michael Müller, Bad Kissingen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 556 days.

(21) Appl. No.: 15/758,683

(22) PCT Filed: Jul. 21, 2016

(86) PCT No.: PCT/EP2016/067357
§ 371 (c)(1),
(2) Date: Mar. 8, 2018

(87) PCT Pub. No.: WO2017/041951
PCT Pub. Date: Mar. 16, 2017

(65) Prior Publication Data
US 2018/0254679 A1    Sep. 6, 2018

(30) Foreign Application Priority Data

Sep. 10, 2015   (EP) .................................... 15184675

(51) Int. Cl.
*H02K 3/14*   (2006.01)
*H02K 3/28*   (2006.01)
*H02K 3/47*   (2006.01)

(52) U.S. Cl.
CPC ................. *H02K 3/14* (2013.01); *H02K 3/28* (2013.01); *H02K 3/47* (2013.01)

(58) Field of Classification Search
CPC .. H02K 3/14; H02K 3/28; H02K 3/12; H02K 3/16; H02K 17/28; H02K 17/02
See application file for complete search history.

(56) References Cited

U.S. PATENT DOCUMENTS 6,455,971 B1 *   9/2002   Palma, Sr. ............... H02K 3/12
                                                           310/180
7,592,732 B2    9/2009   Fujita et al.
(Continued)

FOREIGN PATENT DOCUMENTS

CH         228 524 A      8/1943
CN      101801960 A       8/2009
(Continued)

OTHER PUBLICATIONS

Heiles, Franz: "III.Wechselstromstaenderwicklungen, F. Zusaetzliche Stromwaermeverluste, 2 Massnahmen zur Herabsetzung der zusaetzlichen Stromwaermeverluste"; ,in:Wicklungen elektrischer Maschinen und ihre Herstellung, Springer Verlag, Berlin/Goettingen/Heidelberg; pp. 99; XP055308685;.
(Continued)

*Primary Examiner* — Tran N Nguyen
*Assistant Examiner* — Leda T Pham
(74) *Attorney, Agent, or Firm* — Henry M. Feiereisen LLC (57) ABSTRACT

A stator for an electric machine includes a stator carrier having a plurality of grooves with a respective groove base, and a motor winding having at least one first strand. A predetermined number of first grooves of the plurality of grooves is associated with the first strand. At least one coil section of the first strand is introduced into each of the first
(Continued)

grooves. The first strand has a plurality of individual wires connected electrically in parallel, with each wire formed as a round wire. At least some of the individual wires in each of the coil sections are arranged above one another in a radial direction of the stator. The coil sections are each arranged in the first grooves in such a way that an average radial distance of the individual wires to the groove base is equal for all individual wires.

17 Claims, 8 Drawing Sheets

(56) References Cited

U.S. PATENT DOCUMENTS

| | | | |
|---|---|---|---|
| 7,911,105 B2* | 3/2011 | Neet | H02K 3/14 |
| | | | 310/184 |
| 8,680,733 B2* | 3/2014 | Osada | H02K 3/14 |
| | | | 310/179 |
| 2002/0096959 A1* | 7/2002 | Qin | H02K 3/28 |
| | | | 310/208 |
| 2009/0127966 A1 | 5/2009 | Saari | |
| 2009/0322168 A1 | 12/2009 | Garello | |
| 2011/0210641 A1 | 9/2011 | Chiba et al. | |
| 2011/0210642 A1 | 9/2011 | Chiba et al. | |
| 2012/0133236 A1 | 5/2012 | Buettner et al. | |
| 2012/0181886 A1 | 7/2012 | Osada | |
| 2013/0187512 A1 | 7/2013 | Buettner et al. | |
| 2014/0015348 A1* | 1/2014 | Li | H02K 15/063 |
| | | | 310/43 |

FOREIGN PATENT DOCUMENTS

| | | |
|---|---|---|
| CN | 101720522 A | 6/2010 |
| CN | 102210083 A | 10/2011 |
| CN | 102265486 A | 11/2011 |
| EP | 2 733 824 A1 | 5/2014 |
| JP | 2008048488 A | 2/2008 |
| RU | 2448403 C2 | 4/2012 |
| SU | 1280671 A1 | 12/1986 |

OTHER PUBLICATIONS

Heiles, Franz: "III.Wechselstromstaenderwicklungen, A. Dreiphasige Staenderwicklungen mit ganzer Nutenzahl je Pol und Strang, 5. Schaltungen der Spulen und Stränge"; in: Wicklungen elektrischer Maschinen und ihre Herstellung, Springer Verlag, Berlin/Goettingen/Heidelberg; pp. 59-63; XP055308251.

PCT International Search Report and Written Opinion of International Searching Authority dated Jul. 31, 2017 corresponding to PCT International Application No. PCT/EP2016/067357 filed Jul. 21, 2016.

Buettner et al., U.S. Pat. No. 8,836,193, Sep. 16, 2014, 2011/0316380, Dec. 29, 2011.

Buettner et al., U.S. Pat. No. 8,963,384, Feb. 24, 2015, 2012/0187796, Jul. 26, 2012.

Buettner et al., U.S. Pat. No. 9,281,728, Mar. 8, 2016, 2013-0257197, Oct. 3, 2013.

Shi, Guangyao: "Electrical machine and drive"; CN; Jul. 1, 2013; pp. 1-6; ISBN 978-7-113-16389-1; 2013.

* cited by examiner

STATOR FOR AN ELECTRIC MACHINE, ELECTRIC MACHINE AND PRODUCTION METHOD

CROSS-REFERENCES TO RELATED APPLICATIONS

This application is the U.S. National Stage of International Application No. PCT/EP2016/067357, filed Jul. 21, 2016, which designated the United States and has been published as International Publication No. WO 2017/041951 and which claims the priority of European Patent Application, Serial No. 15184675.5, filed Sep. 10, 2015, pursuant to 35 U.S.C. 119(a)-(d).

BACKGROUND OF THE INVENTION

The present invention relates to a stator for an electric machine comprising a stator carrier, which has a plurality of grooves with a respective groove base, and comprising a motor winding having at least one first strand, wherein a predetermined number of first grooves of the plurality of grooves is associated with the first strand, at least one coil section of the first strand is introduced in each case into each of the first grooves, the first strand has a plurality of individual wires connected electrically in parallel, which are each formed as round wire, and at feast some of the round wires in each of the coil sections are arranged one above the other in the radial direction of the stator. The present invention also relates to an electric machine with such a stator and a rotor. Finally the present invention relates to a method for producing a stator for an electric machine.

Interest is currently being directed to stators for electric machines, in particular alternating current and three-phase motors. Such stators have a stator carrier or a laminated core, into which a plurality of grooves is made. In addition the stator comprises a motor winding, which can have a number of strands for example. In this case each strand can be assigned a phase. Introduced into the respective grooves are parts of the strands or of the motor winding. In such cases the strands can in particular comprise a number of individual wires, which are connected electrically in parallel.

The part of the strand of a lap or wave winding that is not introduced into the grooves is referred to as the winding head. In this case a further distinction is made between the winding head of the switching side and the winding head of the non-switching side. The winding head of the switching side describes the part of the winding head on which the switching connections and the winding ends are arranged.

In the area of electromobility in particular it is necessary for electric motors to provide a high level of efficiency. When the rotor is moved relative to the stator during operation of the electric machine it is the case that, with increasing feed frequency and/or increasing feed current, different voltages are induced into the individual wires, which are arranged in the grooves. The reason for this is that the individual wires are usually arranged one above the other in the radial direction of the stator. Thus the individual wires are at a different distance from the rotor or from the air gap. The groove cross field is also not constant in the radial direction of the groove. The different electrical voltages, which are induced into the individual wires as a result of the arrangement of the individual wires and the unequal flux densities, lead to equalizing currents within the motor winding. This state of affairs is also known by the term "circulating current".

To avoid these equalizing currents the use of what are referred to as Roebel bars is known, in particular with large turbo generators. Such a Roebel bar is a bar-shaped electrical conductor, which comprises a number of parallel part conductors. These part conductors are electrically insulated from one another and specially layered. The part conductors are transposed such that each part conductor assumes any position within the bar within a groove. In this case the part conductors are embodied as wires with a rectangular cross-section.

In this context US 2012/0181886 A1 describes a rotating electric machine with phase windings. Each of the phase windings comprises wire bundles, which have in-slot portions that are arranged in the slots of the stator and turn portions that are arranged outside the slots. In the turn portions the wire bundles are transposed. In this way an even impedance distribution and thus an even electric current in the coil can be achieved.

Furthermore US 2002/0096959 A1 describes a randomly wound winding for an electrical machine. In this case the windings can comprise wire layers connected to one another with randomly wound wires, which on arrangement in the electric machine have substantially the same impedance. The windings can have a first coil, in which the wire layers are arranged in a first layering order, and a second coil, in which the wire layers are arranged in a second layering order oriented opposite to the first layering order.

SUMMARY OF THE INVENTION

The object of the present invention is to demonstrate a solution as to how an electric machine, in which individual wires are arranged one above the other in the grooves of the stator, can be operated more reliably.

This object is achieved in accordance with the invention by a stator, by an electric machine and also by a method with the features as claimed in the respective independent claims. Advantageous developments of the present invention are the subject matter of the dependent claims.

An inventive stator for an electric machine comprises a stator carrier, which has a plurality of grooves with a respective groove base. In addition the stator has a motor winding, which has at least one first strand. In this case the first strand is associated with a predetermined number of first grooves of the plurality of grooves. Further at least one coil section of the first strand is introduced into each of the first grooves in each case. The first strand further has a plurality of individual wires connected electrically in parallel, which are each embodied as round wire. Further at least a few of the individual wires in each of the coil sections are arranged one above the other in the radial direction of the stator. Moreover the coil sections are each arranged in the first grooves such that an average radial distance between the individual wires and the groove base is equal for all individual wires.

A plurality of grooves are made in the stator carrier of the stator, which can be arranged for example distributed evenly in a circumferential direction of the stator carrier. The respective grooves can essentially extend in the radial direction of the stator or of the electric machine. The respective grooves can have a groove opening and a groove base lying opposite the groove opening. In this case the groove base in particular corresponds to the area of the groove that faces away from the rotor or the air gap of the electric machine. The stator carrier can be formed for example from a corresponding laminated core. The motor winding of the stator has at least one strand. Basically there can be provision for the motor winding to have a number of strands, wherein a phase is assigned to each strand. Furthermore a predetermined number of first grooves is assigned to the first strand. The assignment of the first grooves is produced by the embodiment of the electric machine, for example by the number of pole pairs of the electric machine.

The first strand can now be embodied such that said strand forms corresponding windings, which are arranged in part in two first grooves. A number of electrically connected windings, which are arranged one above the other in the radial direction in a groove, form a coil. Connected coils in their turn generate a coil group. The respective sections of the windings, which are arranged in the first grooves, are referred to as coil sections. Each winding accordingly has two coil sections, namely one in the first grooves assigned to it in each case. The first strand is formed from a plurality of individual wires, which are connected electrically in parallel. The individual wires are each embodied as round wires. This means that the individual wires have a round cross-sectional surface. The individual wires can be arranged in parallel to one another for example. Thus the coil sections, which are arranged in the first grooves, have parallel individual wires. Moreover the individual wires are arranged in the first grooves such that at least a few of the individual wires are arranged in the radial direction one above the other or behind one another. In other words a few of the individual wires are arranged behind one another in the radial direction, starting from the groove base. The effect of this arrangement is that, when the electric machine is operating, different electrical voltages will be induced into the respective individual wires. These induced voltages will be engendered by electromagnetic fields with a frequency greater than zero in ongoing operation of the electric machine. Since the respective individual wires in the first groove are at a different radial distance from the air gap and the groove cross field varies, starting from the air gap to the groove base, different induced voltages are also produced in the respective individual wires.

There is now provision, in accordance with the invention, for the coil sections to be arranged in each case in the first grooves such that an average radial distance to the groove base is equal for all individual wires. In other words this means in particular that the respective coil sections in the first grooves do not always have the same arrangement in relation to one another. Basically individual wires in the respective coil sections can be arranged differently. In such cases the individual wires are arranged in the first grooves so that an average radial distance of the respective individual wires to the groove base is essentially equal for all individual wires. For example an individual wire can be arranged in one of the first grooves so that it is at a shorter distance from the groove base. In a further groove of the first grooves this individual wire can be at a comparatively great distance from the groove base. Overall the arrangement of the individual wires is selected so that the respective distances of the wires to the groove base are equal on average for all individual wires. Thus it can be achieved that the same voltage is induced on average into the individual wires of the first strand connected electrically in parallel. In this way the formation of the corresponding equalizing currents or circulating currents in the individual wires can be prevented. This enables losses resulting from the equalizing currents to be reduced. Moreover, the heating-up of and thus, in the worse case, damage to the individual wires as a result of the equalizing currents can be avoided. This thus enables reliable operation of the electric machine to be guaranteed.

In addition the first strand has at least one transposition area in which the first strand is turned in on itself by 180°. In the simplest case a first half of the first grooves can be assigned to the first group of the coil sections. The coil sections can be introduced into this first half of the grooves. Subsequently the strand can be turned in on itself by 180°. Thereafter the coil sections, which are assigned to the second group, can be arranged in the second half of the first grooves. Thus, in the simplest case, by a single turning of the first strand, an arrangement of the individual wires in the respective first groove can be achieved in which no equalizing currents are brought about. Basically there can be provision for the first strand to have a number of transposition areas.

Furthermore the first strand has at least two parallel branches and the first strand has a transposition area in each of the two branches. In other words the number of transposition areas per strand or per phase corresponds to the number of the parallel branches of a strand or a phase. If the first strand has only one branch, it is sufficient for the first strand to have one transposition area. If the first strand has a number of parallel branches, a transposition area is at least to be provided for each of the parallel branches. Thus it can be made impossible in each of the parallel branches for equalizing currents to form in said branches and thus for the motor winding to be damaged.

Preferably the respective coil sections in the first grooves are divided into a first group and a second group, the individual wires of the coil sections of the first group are arranged in a first order in the radial direction and the individual wires of the coil sections of the second group are arranged in a second order, reversed in relation to the first order. Preferably an equal number of coil sections is contained in the first group and in the second group. In other words the individual wires can be arranged in a first order in a first half of the first grooves and in a second half of the first grooves and the individual wires are arranged in the second order. When a coil section has three individual wires for example which are arranged one above the other in the radial direction, in the first group the first individual wire can be arranged first in the radial direction for example, starting from the groove base. The second individual wire can be arranged on the first individual wire and then the third individual wire can be arranged on the second individual wire. The third individual wire is arranged first in the second group, starting from the groove base. The second individual wire is arranged on the third individual wire and the first individual wire is arranged on the second individual wire. The second individual wire, which is arranged in the middle in the first and the second group in each case, is always at the same distance from the groove base. In the first group the first individual wire is arranged directly on the groove base. In the second group the first individual wire is arranged the furthest away from the groove base. Thus the position of the middle second individual wires is produced as the average distance for the first wire. This applies in the same way for the third individual wire. Basically each coil section can also comprise a number of individual wires, which are arranged alongside one another in the circumferential direction of the stator. Such a division of the coil sections into two groups enables an equalizing current to be prevented in a simple way.

In a further form of embodiment the first strand forms a winding with a winding head and the transposition area is arranged within the winding head. If the first strand has a number of transposition areas, these can be arranged at different positions in the winding head. In the area of the winding head the transposition of the first strand can be easily introduced. This enables the motor winding or the first strand to be produced in a simple manner.

In one embodiment the first strand has a plurality of coils, wherein each of the coils has at least one winding, which is embodied between two of the first grooves and the transposition area is arranged within at least one of the coils of the plurality of coils. The first strand can be embodied such that said strand has a number of coils. In this case the coils can have the same coil width. There can also be provision for the coils to have a dissimilar width. In one form of embodiment in this case the transposition can be arranged within the coil. In this case the respective coil sections can initially be introduced into a groove. Subsequently the transposition of the strands can be carried out and subsequently the respective coil sections of the first strand can be introduced into a further groove. This is suitable in particular when the motor winding is provided by a hand winding.

In a further form of embodiment the first strand has a plurality of coils, wherein each the coils has at least one winding, which is embodied between two of the first grooves and the transposition area is arranged at least between two adjacent coils of the plurality of the coils. In this case the transposition can be introduced between two chained coils. A first coil can be wound initially here. At the transition to the adjacent chained coil the position of the parallel individual wires within the first strand is then turned by 180°. In this case there can also be provision for there to be a further turning by 180° before the transition to the next coil. In this case the transposition area can be arranged in particular in the coil connector between the two coils. Such a method is suitable in particular when the motor winding is embodied as a machine winding.

The parallel individual wires can also be assembled into a number of groups and these groups can then be transposed by 180° for example. The transposition area can then be arranged in the area of the winding head.

It is further advantageous for each of the coils to have a plurality of windings, which are arranged one above the other in the radial direction. Thus a number of winding sections are formed in each of the first grooves, which are arranged one after the other in the radial direction. In particular the arrangement of the individual wires is the same in each of the coil sections. Loss mechanisms can thus be effectively restricted, even with a motor winding of which the coils have a number of windings.

Preferably there is provision for the motor winding to have a second strand, to which a predetermined number of second grooves of the plurality of grooves is assigned, and a third strand, to which a predetermined number of third grooves of the plurality of grooves is assigned. In other words the motor winding can have three strands, wherein a phase is assigned to each of the strands. In this case each strand is assigned corresponding grooves of the plurality of grooves.

An inventive electric machine comprises an inventive stator. In addition the electric machine comprises a rotor. The rotor is arranged in particular within the stator and can be rotated relative to the stator. The electric machine can for example involve an asynchronous machine, a synchronous machine, a permanently-excited synchronous machine, a synchronous reluctance machine or the like.

An inventive method serves to produce a stator of an electric machine. The method comprises the provision of a stator carrier, which has a plurality of grooves, each with a groove base. In addition the method comprises the provision of a motor winding, which has at least one first strand. In this case the first strand is assigned a predetermined number of first grooves of the plurality of grooves. Moreover at least one coil section of the first strand is introduced into each of the first grooves, wherein the first strand has a plurality of individual wires connected electrically in parallel, which are each embodied as a round wire, and at least a few of the individual wires are arranged in each of the coil sections one above the other in the radial direction of the stator. In this case the coil sections are each arranged in the first grooves such that an average radial distance of the individual wires from the groove base is equal for all individual wires. In addition the first strand has at least one transposition area, at which the first strand is transposed into itself by 180° and the first strand has at least two electrically parallel branches, wherein the first strand has a transposition area in each of the branches.

As mentioned previously the motor winding can be produced by means of a hand winding. In this case there can be provision for example that initially a first part of the coil, which can have a number of windings for example, is introduced into one of the first grooves. Thereafter all windings of the not yet introduced windings can be turned by 180° in the transposition area. Subsequently these windings can be introduced into the next first groove. In this case the individual windings can be introduced step by step into the next first groove. These steps can be repeated for all coils for each strand and pole.

As an alternative thereto the machine winding can be produced with the aid of a winding machine or series winding machine. This winding machine can for examples have a pull in device. In addition the winding machine can have a winder and a coil form, which reflects the actual shape of the coil. The winding machine can also have corresponding pull in rods on which the respective coils are stored after winding. In this case there can be provision in particular for the individual wires to be fed to the winder via a corresponding wire guide. This wire guide can have corresponding through-openings, through which the individual wires are guided. In addition the wire guide can be embodied in particular so that these can be turned by 180°. In this way it is made possible for example for a first coil to be wound first of all and, at the transition to the subsequent chained coil, for the position of the parallel individual wires within the winding to be transposed by 180°. Thus the machine winding can be produced in a simple and low-cost way.

The preferred forms of embodiment presented in relation to the inventive stator and their advantages apply correspondingly to the inventive electric machine and also to the inventive method.

Further features of the invention emerge from the claims, the figures and the figure description. The features and combinations of features given here in the description, and also the features and combinations of features shown subsequently in the figure description and/or in the figures on their own are able to be used not only in the respective combination specified, but also in other combinations or on their own, without departing from the framework of the invention.

BRIEF DESCRIPTION OF THE DRAWING

The invention will now be explained in greater detail on the basis of the preferred exemplary embodiments as well with reference to the enclosed drawings. In the figures.

DETAILED DESCRIPTION OF PREFERRED EMBODIMENTS

Elements that are the same and have the same function are provided with the same reference characters in the figures.

Figure 1:
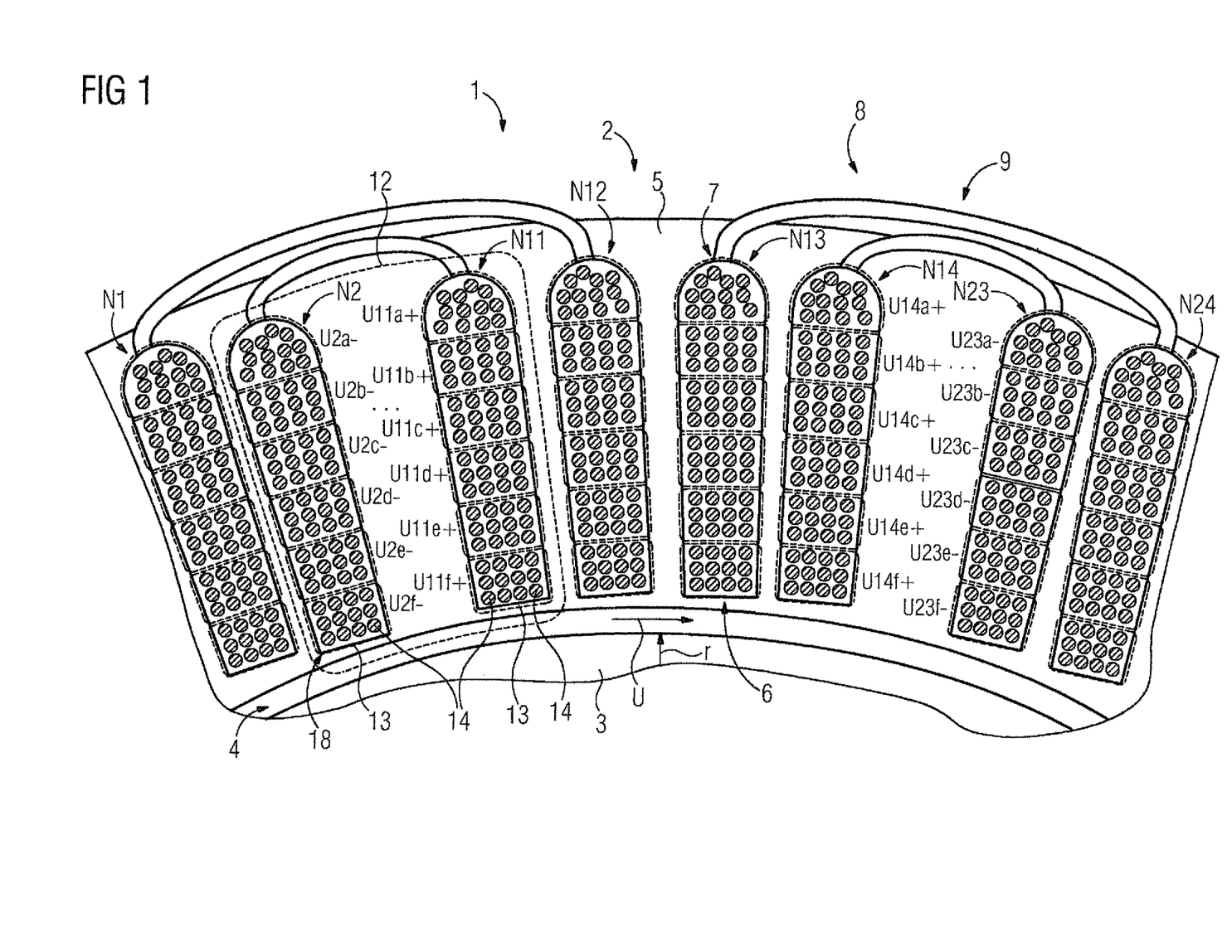
FIG. 1 shows a sectional diagram of an electric machine according to the prior art, wherein the electric machine has a stator with a plurality of grooves, into which individual wires are introduced in each case.

FIG. 1 shows a sectional diagram of an electric machine 1 in accordance with the prior art in a cutaway side view. The electric machine 1 comprises a stator 2. Moreover the electric machine comprises a rotor 3, which is arranged within the stator 2. An air gap 4 is embodied between the stator 2 and the rotor 3.

The stator 2 comprises a stator carrier 5 or a laminated core respectively, into which a plurality of grooves N1 to N48 are made. In the present exemplary embodiment the stator 2 comprises 48 grooves N1 to N48, wherein in this example only the grooves N1, N2, N11, N12, N13, N14, N23 and N24 are shown. Each of the grooves N1 to N48 comprises a groove base 6, which corresponds to the area of the respective grooves N1 to N48 that faces towards the rotor 3 or the air gap 4. Moreover each of the grooves N1 to N48 has a groove opening 7, which lies opposite the groove base 6. The respective grooves N1 to N148 extend in a radial direction r of the electric machine 1 or of the stator 2 respectively. In addition the grooves N1 to N48 are arranged next to one another, distributed evenly in a circumferential direction U of the stator 2.

Furthermore the stator 2 comprises a motor winding 8, which can have a number of strands 9, 10, 11. In this example a first strand 9 of the motor winding 8 is shown. As explained in greater detail below, first grooves of the plurality of grooves N1 to N48 are assigned to the first strand. The first strand 9 is wound in this case such that said strand has a number of coils 12. In this example a coil 12 is embodied at the grooves N2 and N11. The coil 12 comprises a plurality of windings 18, which are arranged in the radial direction r behind one another or one above the other. In the present exemplary embodiment the coil 12 comprises six windings 18. Arranged in grooves N1 to N48 in each case is a coil section 13 of the windings. In this example a few of the coil sections are labeled 13. For example the lowest coil section 13 in the groove N11 is labeled "U11f+". In this case "U" designates the phase or the strand 9, 10, 11. The number "11" describes the groove N11, in which the coil section 13 is arranged. The letter "f" describes the position of the coil section 13 within the coil 12. Finally "+" designates the polarity of the coil section 13.

The first strand 8 comprises a plurality of individual wires 14, which are embodied as round wires. Thus each of the coil sections 13 also comprises a plurality of individual wires 14.

In this example each coil section 13 comprises twelve individual wires 14. In this case four individual wires 14 are arranged in each case in the circumferential direction U next to one another and three individual wires 14 in each case are arranged one above the other in the radial direction r. In addition the arrangement of the respective individual wires in the coil sections 13 is the same. When the electric machine 1 is operating, as a result of the electric fields with a frequency of greater than zero, electrical voltages can be induced into the individual wires 14. The fact that the respective individual wires 14 in the grooves N1 to N48 are at a different distance in the radial direction r from the stator 3 and the electromagnetic fields are different locally in the respective groove N1 to N48 means that the respective induced voltage differs. This difference leads to equalizing currents that can lead to losses and in the worst case to the individual wires 14 being damaged.

Figure 2:
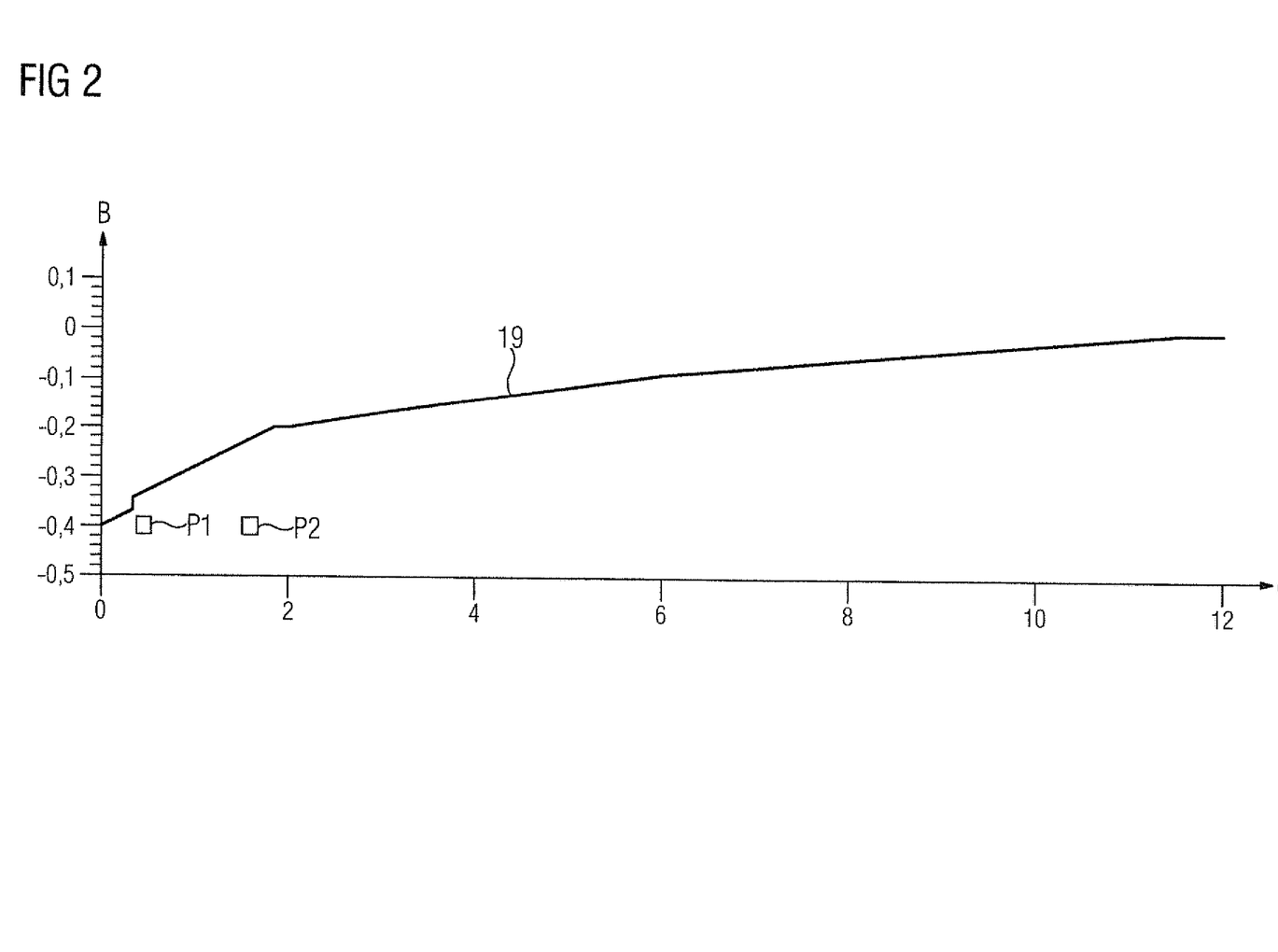
FIG. 2 shows a diagram, which describes a graph of the magnetic flux density in the groove.

To this end FIG. 2 shows a diagram that describes the course of the magnetic flux density B in one of the grooves N1 to N48. Plotted on the abscissa is a distance d in mm in the radial direction r. Plotted on the ordinate is the magnetic flux density B in T. The curve 19 describes the normal component of the magnetic flux density B along a virtual line that lies radially in the groove N1 to N48. The two points P1 and P2 or markers describe the positions of the mid points of two individual wires 14. The magnetic flux density B within the grooves N1 to N48 has a non-linear course. This means that the groove cross field in the radial direction r of the groove N1 to N48 is not constant. The different magnetic flux densities B lead to different electrical voltages, which are induced into the individual wires. The result is equalizing currents within the motor winding 8.

Figure 3:
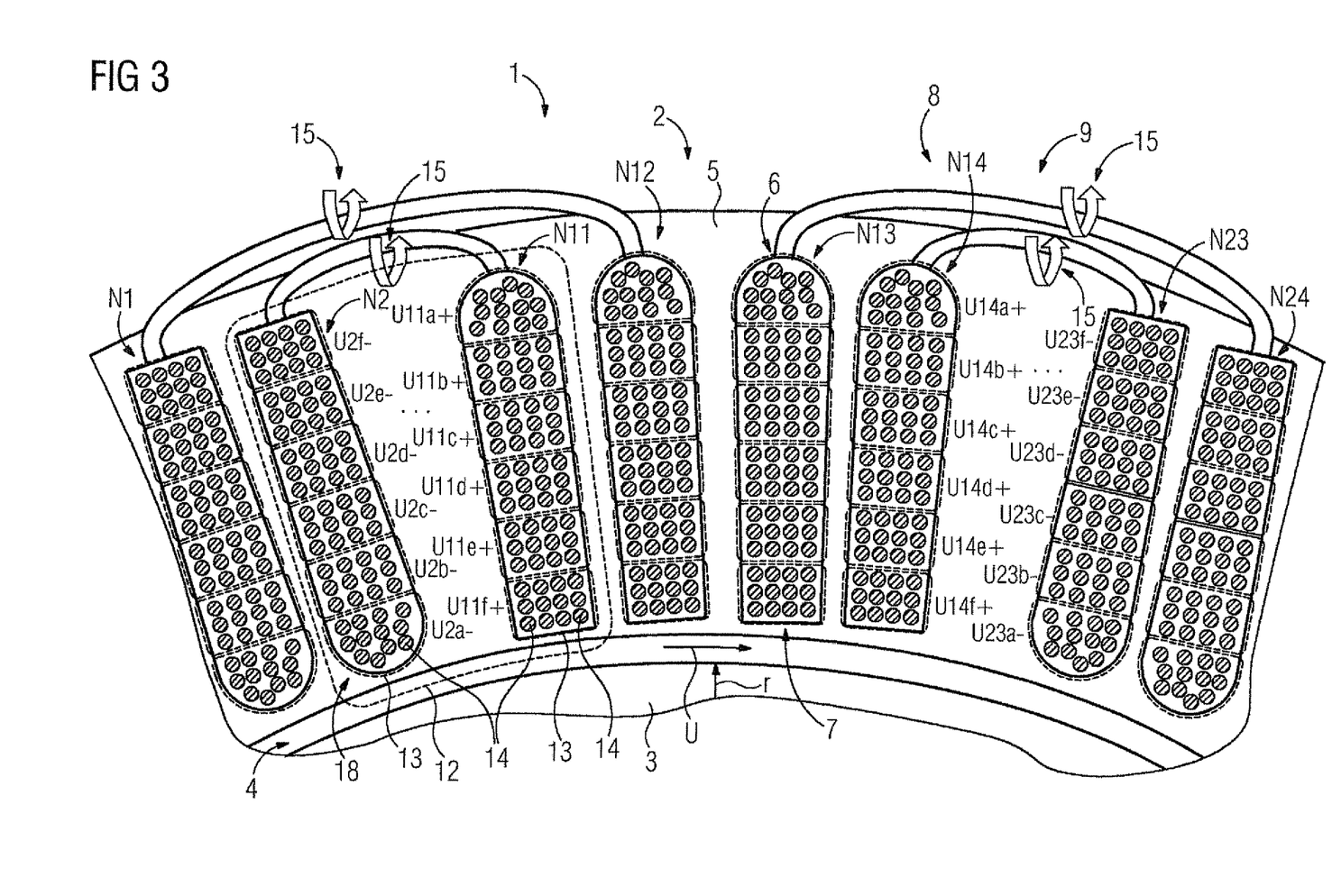
FIG. 3 shows a sectional diagram of an electric machine in accordance with a first form of embodiment of the present invention.

FIG. 3 shows a sectional diagram of an electric machine 1 in accordance with a first form of embodiment of the present invention. Here the first strand 9 or the winding has at least one transposition area 15, in which the first strand 9 is turned in on itself by 180°. In the present exemplary embodiment the first strand 9 has four transposition areas 15 shown. In this case the transposition areas 15 are arranged with a coil 12. In the coil 12, in which the windings 18 are introduced into the grooves N2 and N11, a transposition is provided in this figure. In this case the individual coil sections 13 in the coil 12 correspond to those in accordance with FIG. 1. At the transition between the groove N11 and the groove N2 all windings 18 are turned by 180°. This leads, in the groove N2, to the coil sections 13 and thus also the individual wires 14 being arranged in the opposite direction compared to groove N11. During production, which can be done for example by means of hand winding, initially the first part of the coil 12, which comprises the six coil sections 13, can be introduced into the groove N11. Thereafter all windings 18 not yet introduced can be turned by 180° and subsequently introduced into the groove N2. The same process has been carried out for the coil 12, which is assigned to the grooves N1 and N12. In addition the same arrangement is produced for the coil 12, which is assigned to the grooves N13 and N24 and also for the coil 12, which is assigned to the grooves N14 and N23.

Figure 4:
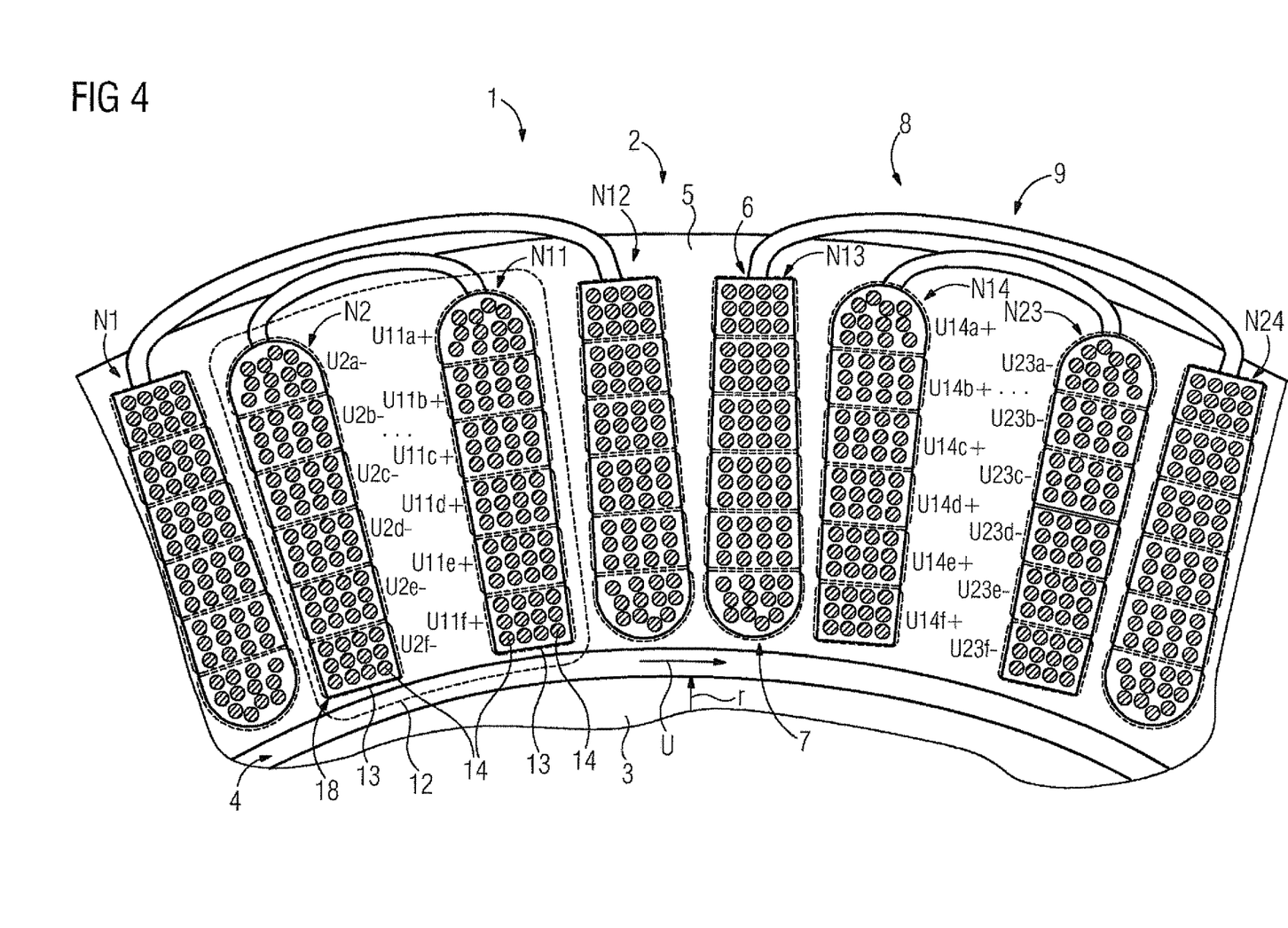
FIG. 4 shows a sectional diagram of an electric machine in accordance with a further form of embodiment of the present invention.

FIG. 4 shows a sectional diagram of an electric machine 1 in accordance with a further form of embodiment of the present invention. Here the coil 12, which comprises the grooves N2 and N11, corresponds to the coil 12 in accordance with FIG. 1. The coil 12 chained to this coil 12, which comprises the grooves N1 and N12, is embodied such that the coil sections 13 are arranged in the reverse direction in the respective grooves N1, N12. Here, during the production of the motor winding 8, first of all the coil that comprises the grooves N2 and N11 can be wound. At the transition to the subsequent chained coil 12 that comprises the grooves N1 and N12 the parallel individual wires 14 within a winding can be turned by 180°. This is particularly suitable if the machine winding 8 is wound with a corresponding winding machine. The same arrangement is produced for the coil 12 that comprises the grooves N14 and N23 and the coil 12 that comprises the grooves N13 and N24.

Basically the coil sections 13, which are assigned to the first grooves for the first strand 9, can be divided into two groups. In this case the individual wires 14 in the coil sections 13 can be arranged in the first group in the radial direction r in accordance with a first order 16. In the coil sections 13, which are assigned to the second group, the individual wires 14 can be arranged in the radial direction in a second order 17 reversed in relation to the first order 16. This is illustrated in the present example on the basis of FIG. 5, which shows an enlarged diagram of FIG. 4. In this diagram the coil sections 13 are arranged in the groove N14 of the first group. The coil sections 13 of the groove N13 are assigned to the second group. Arranged in the groove N14 are the individual wires 14, which in this figure are designated by the letters a to l, in the first order 16 in the radial direction r. In this case the first and the second group are preferably assigned the same number of coil sections 13.

Figure 5:
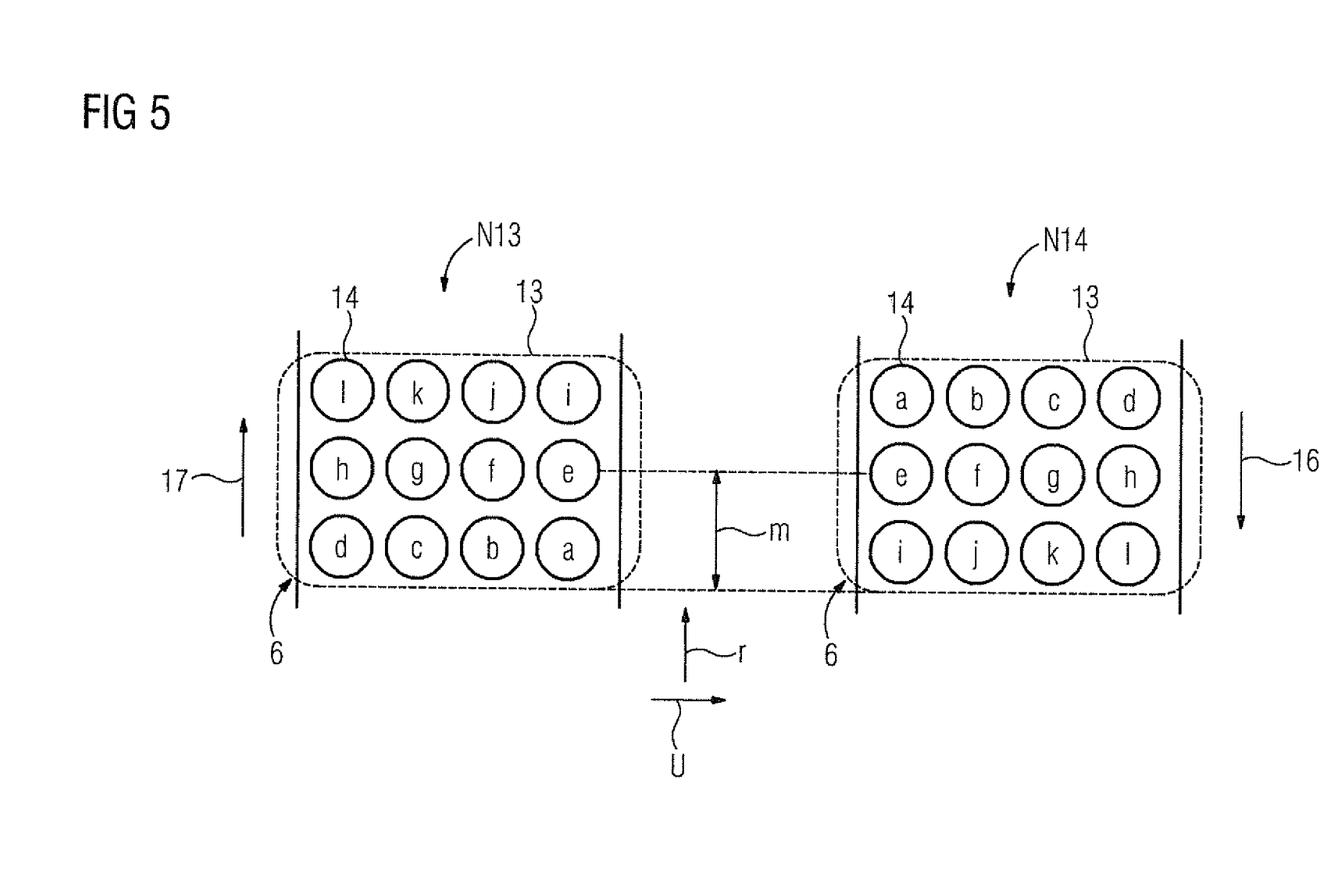
FIG. 5 shows an enlarged view of FIG. 4.

In the present example the individual wires 14, which are designated by a, e and i, are considered by way of example. For the groove N14 these are arranged in the radial direction r in the first direction 16. In this arrangement the individual wire 14 that is labeled e is arranged in the middle. The individual wire 14 that is labeled i is arranged next in relation to the groove base 6 and thus to the rotor 3. The individual wire 14 that is labeled a is the wire of these individual wires 14 that is arranged furthest from the groove base 6. For the groove N13 these individual wires that are labeled a, e and i are arranged in the second, opposite direction 17. Here the individual wire 14 that is labeled a, is arranged next to the groove base 6. The individual wire 14 that is labeled e is once again arranged in the middle. The individual wire 14 that is labeled i is the wire that is at the greatest distance of these individual wires 14 from the groove base 6. Through these two different arrangements or the arrangement in the first order 16 and the second order 17 the same average distance m in the radial direction to the groove base 6 is produced on average for all individual wires 14 in a coil section 13. This enables the effect to be achieved of the same voltage being induced overall into the individual wires 14. Equalization currents can thus be prevented from forming within the individual wires 14.

Figure 6:
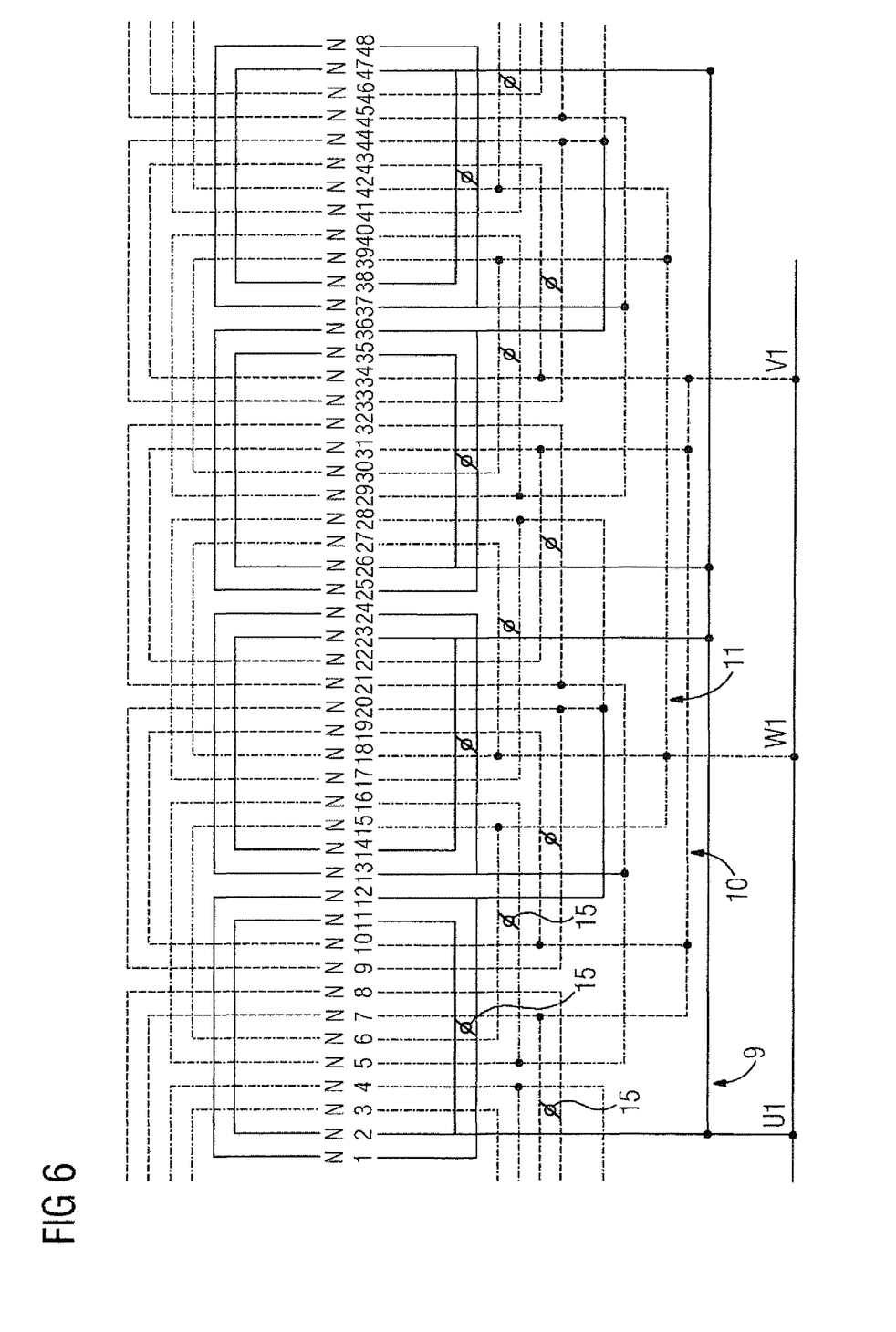
FIG. 6 shows a winding diagram of the electric machine in accordance with FIG. 4.

FIG. 6 shows a winding diagram of the electric machine 1 in accordance with FIG. 4. In this diagram the solid lines describe the first strand 9, the dashed lines describe the second strand 10 and the dotted and dashed lines describe the third strand 11. In this case the grooves N1, N2, N11, N12, N13, N14, N23, N24, N25, N26, N35, N36, N37, N38, N47 and N48 are assigned to the first strand 9 as first grooves. The further assignment of the grooves N1 to N48 to the strands 10 and 11 is to be found in the winding diagram. In the present example each strand 9, 10, 11 has four parallel branches. Basically there is provision for each of the strands 9, 10, 11 to have a transposition area 15 for each parallel branch in which the first strand is turned by 180° into itself. In this case each of the strands 9, 10, 11 is assigned one phase.

Figure 7:
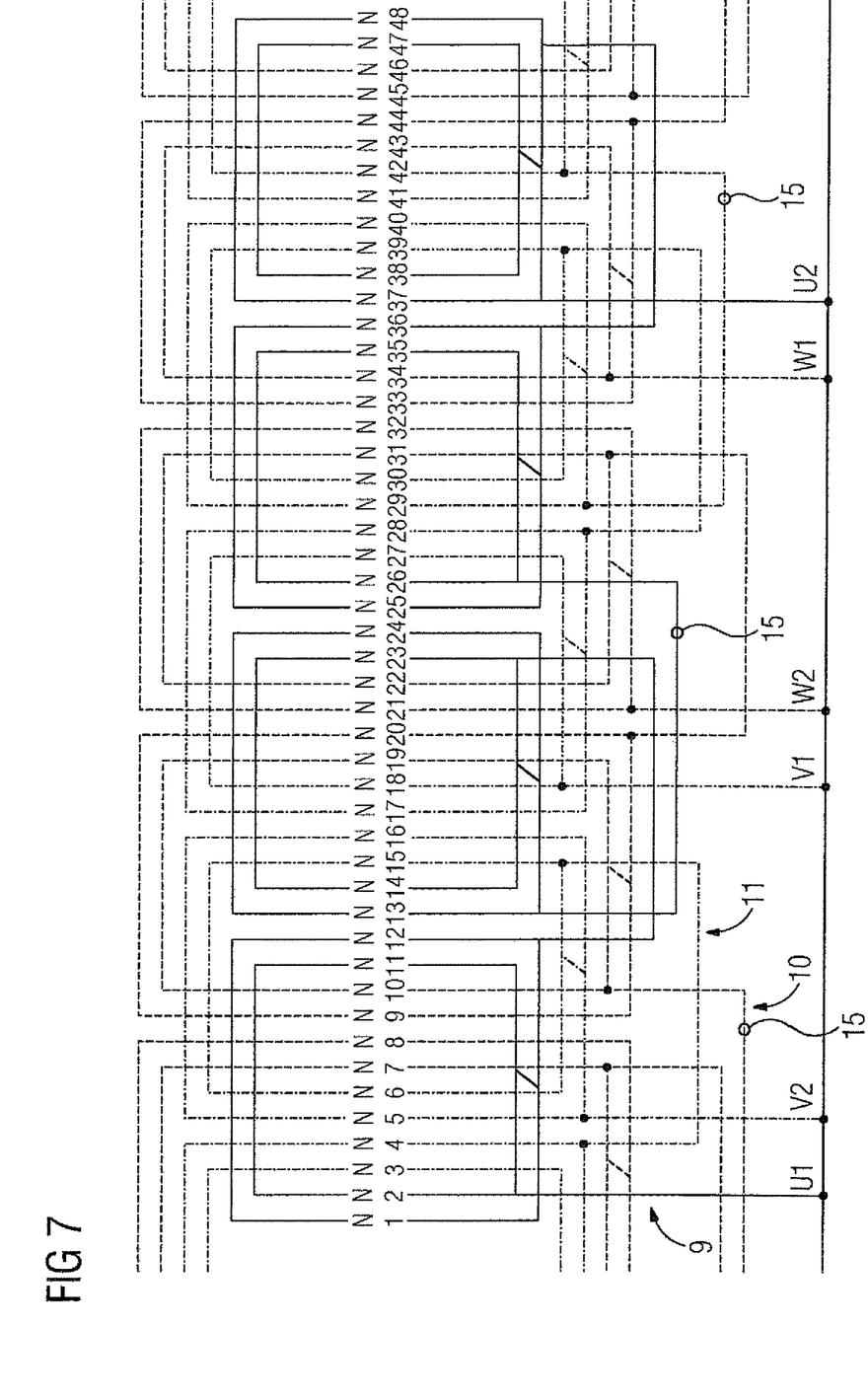
FIG. 7 shows a winding diagram of an electric machine in accordance with a further form of embodiment.

By comparison thereto, FIG. 7 shows a winding diagram of an electric machine 1 in accordance with a further form of embodiment. By comparison with FIG. 6, each of the strands 9, 10, 11 only has one parallel branch. Here a transposition area 15 is provided in each of the strands 9, 10, 11.

Figure 8:
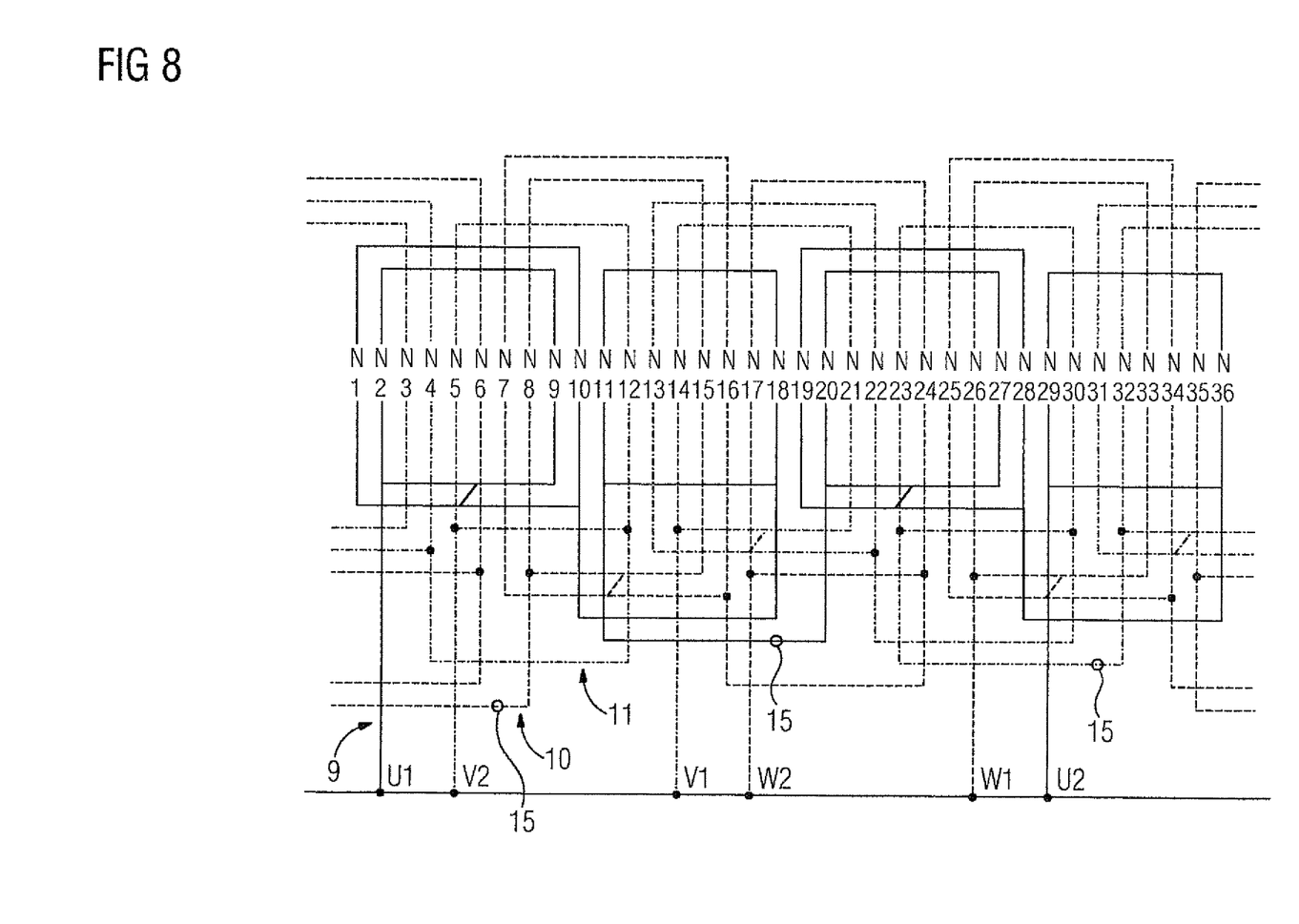
FIG. 8 shows a winding diagram of an electric in accordance with a further form of embodiment.

FIG. 8 shows a winding diagram of an electric machine 1 in accordance with a further form of embodiment. Here the electric machine 1 is embodied with 36 grooves N1 to N36. Here too each of the strands 9, 10, 11 has one branch. In each of the strands 9, 10, 11 a transposition area 15 is provided. In the example of FIG. 7 the electric machine 1 has an even number of 4 holes. The number of holes corresponds to the number of grooves N1 to N48 per strand and number of pole pairs. In the form of embodiment in accordance with FIG. 8 the number of holes is 3 and is thus an odd number.

What is claimed is:

1. A stator for an electric machine, said stator comprising:
   a stator carrier having a plurality of grooves, each said groove having a groove base; and
   a motor winding including a first strand, with a predetermined number of first grooves of the plurality of grooves being assigned to the first strand, said first strand having coil sections which are introduced in the first grooves, respectively, said first strand including a plurality of individual wires which are connected electrically in parallel, with each wire embodied as a round wire, at least a few of the individual wires in each of the coil sections being arranged above one another in a radial direction of the stator, said coil sections being arranged in the first grooves such that an average radial distance of the individual wires from the groove base is equal for all of the individual wires, said first strand configured to have at least two electrically parallel branches and having in each of the branches a transposition area, at which, after winding of a first coil, at a transition to a subsequent chained coil, the parallel individual wires are turned by 180° and then further turned by 180° within a winding so that the coil sections and the individual wires are arranged in opposite directions between the first grooves.

2. The stator of claim 1, wherein the coil sections in the first grooves are divided into a first group and a second group, the individual wires of the coil sections of the first group being arranged in a first order in the radial direction, and the individual wires of the coil sections of the second group being arranged in a second order opposite to the first order.

3. The stator of claim 1, wherein the first strand is configured to form a winding with a winding head, said transposition area being arranged within the winding head.

4. The stator of claim 1, wherein the first strand includes a plurality of coils, each of the coils having at least one winding, which is formed between two of the first grooves, said transposition area being arranged within at least one coil of the plurality of coils.

5. The stator of claim 4, wherein each of the coils has a plurality of windings, which are arranged above one another in the radial direction.

6. The stator of claim 1, wherein the first strand includes a plurality of coils, each of the coils having at least one winding, which is formed between two of the first grooves, said transposition area being arranged at least between two adjacent coils of the plurality of coils.

7. The stator of claim 5, wherein each of the coils has a plurality of windings, which are arranged above one another in the radial direction.

8. The stator of claim 1, wherein the motor winding includes a second strand, to which a predetermined number of second grooves of the plurality of grooves is assigned, and a third strand, to which a predetermined number of third grooves of the plurality of grooves is assigned.

9. An electric machine, comprising:
a stator comprising a stator carrier having a plurality of grooves, each said groove having a groove base, and a motor winding including a first strand, with a predetermined number of first grooves of the plurality of grooves being assigned to the first strand, said first strand having coils sections which are introduced in the first grooves, respectively, said first strand including a plurality of individual wires which are connected electrically in parallel, with each wire embodied as a round wire, at least a few of the individual wires in each of the coil sections being arranged above one another in a radial direction of the stator, said coil sections being arranged in the first grooves such that an average radial distance of the individual wires from the groove base is equal for all of the individual wires, said first strand configured to have at least two electrically parallel branches and having in each of the branches a transposition area, at which, after winding of a first coil, at a transition to a subsequent chained coil, the parallel individual wires are turned by 180° and then further turned by 180° within a winding so that the coil sections and the individual wires are arranged in opposite directions between the first grooves; and
a rotor interacting with the stator.

10. The electric machine of claim 9, wherein the coil sections in the first grooves are divided into a first group and a second group, the individual wires of the coil sections of the first group being arranged in a first order in the radial direction, and the individual wires of the coil sections of the second group being arranged in a second order opposite to the first order.

11. The electric machine of claim 9, wherein the first strand is configured to form a winding with a winding head, said transposition area being arranged within the winding head.

12. The electric machine of claim 9, wherein the first strand includes a plurality of coils, each of the coils having at least one winding, which is formed between two of the first grooves, said transposition area being arranged within at least one coil of the plurality of coils.

13. The electric machine of claim 12, wherein each of the coils has a plurality of windings, which are arranged above one another in the radial direction.

14. The electric machine of claim 9, wherein the first strand includes a plurality of coils, each of the coils having at least one winding, which is formed between two of the first grooves, said transposition area being arranged at least between two adjacent coils of the plurality of coils.

15. The electric machine of claim 14, wherein each of the coils has a plurality of windings, which are arranged above one another in the radial direction.

16. The electric machine of claim 9, wherein the motor winding includes a second strand, to which a predetermined number of second grooves of the plurality of grooves is assigned, and a third strand, to which a predetermined number of third grooves of the plurality of grooves is assigned.

17. A method for producing a stator of an electric machine, said method comprising:
providing a stator carrier with a plurality of grooves;
assigning a predetermined number of first grooves of the plurality of grooves to a first strand of a motor winding;
introducing a coil section of the first strand into each of the first grooves;
connecting a plurality of individual round wires of the first strand electrically in parallel;
arranging at least a few of the individual wires in each of the coil sections above one another in a radial direction;
arranging the coil sections hi the first grooves such that an average radial distance from the individual wires to the groove base is equal for all individual wires; and
providing in each of at least two electrically parallel branches of the first strand a transposition area, at which, after winding of a coil, at a transition to a subsequent chained coil, the parallel individual wires are turned by 180° and then further turned by 180° within a winding so that the coil sections and the individual wires are arranged in opposite directions between the first grooves.

* * * * *

UNITED STATES PATENT AND TRADEMARK OFFICE
CERTIFICATE OF CORRECTION

PATENT NO. : 11,070,100 B2
APPLICATION NO. : 15/758683
DATED : July 20, 2021
INVENTOR(S) : Michael Bernhardt, Daniel Fritsch and Michael Müller Page 1 of 1

It is certified that error appears in the above-identified patent and that said Letters Patent is hereby corrected as shown below:

On the Title Page

Item (30) Foreign Application Priority Data:
Replace "EP15184675" with the correct -- EP15184675.5 --.

Item (56) Reference Cited
FOREIGN PATENT DOCUMENTS:
Replace "CN 101801960 A" with the correct -- CN 101501960 A --.

In the Claims

In Column 12, Claim 17, Lines 31:
Replace "hi the first" with -- in the first --.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*